United States Patent Office 3,256,296
Patented June 14, 1966

3,256,296
METHOD OF PRODUCING 3-INDOLEALKANOIC ACID
David W. Young, Homewood, Ill., assignor to Sinclair Research, Inc., New York, N.Y., a corporation of Delaware
No Drawing. Filed Dec. 27, 1963, Ser. No. 334,031
7 Claims. (Cl. 260—319)

This invention relates to a process for the preparation of 3-indolealkanoic acids or the corresponding alkali metal salts using the alkali metal salts of styrene-maleic anhydride resins as catalysts.

The acids prepared by the process of this invention have the following structural formula:

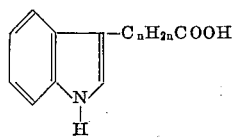

wherein $n$ is an integer from about 1 to 17, preferably 1 to 7. Examples of 3-indolealkanoic acids are 3-indoleacetic acid, 3-indolepropionic acid, 3-indolepentanoic acid, 2-(3'-indolyl)-3-ethylpentanoic acid and the like.

The 3-indolealkanoic acids of this invention have been the subject of investigation over a period of the last 30 years regarding their plant growth-regulating properties. A great many useful effects have been discovered. For example, indoleacetic acid affects the rooting of certain varieties of potato. Beta-(3-indolyl)propionic acid can be used to prepare lysergic acid useful as a pharmaceutical.

It has now been found that 3-indolealkanoic acid can be prepared in high yields by a novel process. The process of this invention comprises the formation of the salts of 3-indolealkanoic acids by reacting indole with hydroxy acids in the presence of an alkali metal salt of a styrene-maleic anhydride resin. If the indolealkanoic acid is desired, the reaction mixture is acidified in order to recover 3-indolealkanoic acid. In order to maintain the styrene-maleic anhydride resin in the alkali metal salt from the reaction is carried out in an aqueous medium having sufficient alkali metal to keep the resin and the product in alkali metal salt form. The resulting alkali metal indolealkanoate can be acidified to form the 3-indolealkanoic acid. The indole used in the reaction may be substituted with non-deleterious substituents such as alkyl radicals.

The hydroxy acids used in the process are represented by the following formula:

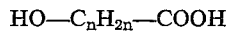

$$HO-C_nH_{2n}-COOH$$

where $n$ is an integer having a value from about 1 to about 1, preferably from about 1 to 7. The hydroxy acids may be substituted with non-deleterious substituents. Illustrative of the hydroxy acids used are glycolic acid, 2-hydroxy propionic acid (lactic acid), 2-hydroxy butyric acid, 2-hydroxy pentanoic acid, 5-hydroxy pentanoic acid, 6-hydroxy hexanoic acid, the hydroxy octanoic acids, the hydroxy non-octanoic acids, the hydroxy decanoic acids and the hydroxy dodecanoic acids, etc.

The styrene-maleic anhydride resin used to catalyze the reaction is in the form of the alkali metal salt. The styrene-maleic anhydride copolymer, the alkali metal salt of which is employed in the present invention, is a resinous copolymer of styrene and maleic anhydride having about 0.5 to 3 moles of styrene per mole of maleic anhydride, and preferably about 1 mole of styrene per mole of maleic anhydride. The molecular weights of the copolymers are generally at least about 600 up to about 2,000 but can be of higher molecular weight as long as the alkali metal salt thereof is water-soluble. The melting points of the lower molecular weight copolymers will generally range from about 80° to 200° C. as determined by the Fisher-Johns Melting Point Apparatus. The amount of copolymer used may vary widely but it should be present in an amount sufficient to promote the formation of the 3-indolealkanoate. Normally from about 2% to about 50% and preferably 5% to 30% copolymer based on the reactants is sufficient.

Preparation of the copolymer of the invention can be by any of the known methods desired. A preferred method is by solution polymerization where the monomers are polymerized in a suitable solvent employing as a polymerization catalyst a free-radical peroxide catalyst, preferably benzoyl peroxide or dicumyl peroxide, at a temperature of about 75 to 300° C. or more. Suitable solvents include the aromatic hydrocarbon solvents, which can be either the active aromatic solvents, that is, containing an active hydrogen atom, such as cumene, p-cymene, etc. or the non-active aromatics such as xylene, toluene, etc. The active aromatic solvents are chain-terminating solvents and give lower molecular weight conditions. Other suitable solvents are the ketones, such as methylethylketone, which are also active solvents. The preferred manner of carrying out the polymerization is by what is known in the art as incremental feed addition. By this method the monomers and catalyst are first dissolved in a portion oft he solvent in which the polymerization is to be conducted and the resulting solution fed in increments into a reactor containing solvent heated to reaction temperature, usually the reflux temperature of the mixture. When an aromatic solvent is employed as the solvent for the polymerization, the formation of the copolymers causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the products necessitates a solvent-stripping operation.

The styrene-maleic anhydride copolymer may be hydrogenated to eliminate residual unsaturation. However, both the hydrogenated and unhydrogenated copolymers form extremely effective catalysts, thus hydrogenation is not necessary.

Formation of the alkali metal salt of the copolymer can be accomplished by simple hydrolysis of the copolymer with an aqueous alkali metal hydroxide solution. Any of the alkali metal hydroxides can be utilized, although sodium hydroxide is preferred. The hydrolysis can be conveniently carried out by making a slurry in distilled water of at least 2 moles of alkali metal hydroxide per mole of the repeating copolymer unit and heating until hydrolysis is complete. Although stoichiometric proportions which give the full, i.e. the di, salt of the copolymer are preferred, either copolymer or metal hydroxide may be employed in excess as long as the salt formed is water-soluble. Preferably, the hydrolysis is carried out at the time the indole reaction mixture is formed. The reaction takes place in a basic medium and thus when the styrene-maleic anhydride copolymer is added to this basic media, the alkali metal salt is formed. Normally sufficient alkali metal salt is present to give the alkali metal salt of the 3-indolealkanoic acid product.

The order of contacting the reactants is not critical. They may all be added to the reaction vessel at once or separately in any desired order. Preferably, they are added so that the alkali metal salt of the styrene maleic anhydride resin forms in solution. Water is present during the reaction in amounts of at least about 5%, often up to about 300% or more based upon the weight of the reactants present. In order to maintain a reasonably rapid reaction rate the hydroxy acid concentration should be maintained greater than 5% of the reaction mixture. Reaction temperatures usually vary from about 200 to 350° C., preferably the reaction temperature should be in the range of about 200 to 300° C. A sufficient pressure should be maintained to keep the reactants in the liquid state. Depending upon the nature of the reactants and temperatures employed, reaction times have varied from 3 to 24 hours but the time is dependent upon, for instance, the nature of the reaction conditions, reaction vessel, etc.

Because the reaction is carried out in a basic aqueous medium, the 3-indolealkanoic acid is formed at least in part as an alkali metal salt. The salt of the 3-indolealkanoic acid can be recovered by any desired method. A convenient recovery procedure is to add enough water in order to dissolve the alkali metal 3-indolealkanoate. This water solution is then extracted with a solvent such as ether in order to remove unreacted hydroxy acid and indole.

The aqueous phase containing the 3-indolealkanoate is then acidified with a mineral acid such as hydrochloric or sulfuric or with an organic acid such as formic or acetic acid. The acidification results in the formation of a 3-indoleacidic acid precipitate which can be removed from the water by filtration, centrifugation, etc.

The following examples further illustrate the process of the present invention.

*Example I*

An agitated steel autoclave was charged with 140 grams potassium hydroxide and 180 grams of indole followed by the gradual addition of 185 g. of 70% aqueous glycolic acid. The mixture was then heated to 250–275° C., under pressure, for eight hours and cooled to 25° C. Twenty-seven liters of hot water were used to dissolve the potassium indoleacetate. The solution was then cooled to 20° C., and extracted with ethyl ether. The water phase was acidified with hydrochloric acid and then cooled to 5 to 10° C. After 28 hours the precipitated product was collected, washed with ice water and dried. A yield of 198 grams (71%) with a melting point of 163–166° C. was obtained. The reported melting point is 164.5–165° C. [Beil., XXII, 51 (1953)].

*Example II*

An agitated steel autoclave was charged with 140 grams potassium hydroxide and 180 grams of indole followed by the gradual addition of 185 grams of 70% aqueous glycolic acid that contained 13.5 grams of a styrene-maleic anhydride resin having a styrene-maleic anhydride mole ratio of 1:1 and a molecular weight of about 1,000. The mixture was then heated to 250 to 275° C., under pressure, for eight hours and cooled to 25° C. Twenty-seven liters of hot water were used to dissolve the potassium indoleacetate. The solution was then cooled to 20° C., and extracted with ethyl ether. The water phase was acidified with hydrochloric acid and then cooled to 5 to 10° C. After 28 hours the precipitated product was collected, washed with ice water and dried. A yield of 278 grams (99+%) with a melting point of 163–166° C. was obtained.

*Example III*

A steel autoclave was charged with 14 grams potassium hydroxide and 18 grams of indole followed by the gradual addition of 18.5 grams of 72% aqueous glycolic acid that contained 3.2 grams of hydrogenated styrene-maleic anhydride resin with a styrene to maleic anhydride ratio of 1:1 and a molecular weight of about 1,000 that had been hydrogenated or reduced in hot acetic acid with zinc dust. The reduced resin, on analysis, shows 71.70% carbon and 5.37% hydrogen. The mixture was then heated to 250–260°, under pressure, for about seven hours, cooled, and 2.5 l. of water added to dissolve the potassium indoleacetate. The water solution was extracted with ether. The aqueous phase was acidified with HCl and cooling to 10°. After 18 hours, the precipitated product was collected, washed with ice water, and dried. A 95+% yield (27 grams) of product with a melting point of 163–166° C. was obtained.

What is claimed:

1. A process for producing an alkali metal salt of 3-indolealkanoic acid which comprises reacting at an elevated temperature of about 200° to 350° C. indole with a hydroxy acid having the following formula:

wherein *n* is an integer from 1 to 17 in the presence of at least about 5% water and a water-soluble alkali metal salt of a styrene-maleic anhydride resin having about 0.5 to 3 moles of styrene per mole of maleic anhydride, said salt of a styrene maleic anhydride resin being present in an amount sufficient to promote the formation of the 3-indolealkanoic acid salt, and said reaction medium having sufficient alkali metal to give the alkali metal salt of the 3-indolealkanoic acid product.

2. The process of claim 1 wherein the temperature is from 200° to 300° C.

3. The process of claim 1 wherein the reaction product is acidified to form a 3-indolealkanoic acid.

4. The process of claim 1 wherein the amount of styrene-maleic anhydride copolymer is from about 5 to 30% of the reactants.

5. The process of claim 1 wherein the hydroxy acid is an alpha hydroxy acid.

6. The process of claim 4 wherein the acid is glycolic acid.

7. The process of claim 4 wherein the acid is lactic acid.

References Cited by the Examiner

UNITED STATES PATENTS 3,047,585   7/1962   Johnson _____ 260—319

NICHOLAS S. RIZZO, *Primary Examiner.*

MARY U. O'BRIEN, *Assistant Examiner.*